US011256460B2

United States Patent
Goslin et al.

(10) Patent No.: US 11,256,460 B2
(45) Date of Patent: Feb. 22, 2022

(54) DIGITAL COMPANION DEVICE WITH DISPLAY

(71) Applicant: Disney Enterprises, Inc., Burbank, CA (US)

(72) Inventors: Michael P. Goslin, Sherman Oaks, CA (US); Nathan D. Nocon, Valencia, CA (US); Timothy M. Panec, Studio City, CA (US); Jonathan R D Hsu, Pomona, CA (US); Janice K. Rosenthal, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/268,248

(22) Filed: Feb. 5, 2019

(65) Prior Publication Data

US 2019/0243594 A1 Aug. 8, 2019

Related U.S. Application Data

(60) Provisional application No. 62/626,574, filed on Feb. 5, 2018.

(51) Int. Cl.
| | |
|---|---|
| *G06F 3/14* | (2006.01) |
| *G06F 3/16* | (2006.01) |
| *G06F 9/451* | (2018.01) |
| *G06F 3/01* | (2006.01) |
| *G06F 40/30* | (2020.01) |
| *G02B 30/56* | (2020.01) |

(52) U.S. Cl.
CPC ............... *G06F 3/14* (2013.01); *G02B 30/56* (2020.01); *G06F 3/011* (2013.01); *G06F 3/167* (2013.01); *G06F 9/453* (2018.02); *G06F 40/30* (2020.01)

(58) Field of Classification Search
CPC . G06F 3/14; G06F 3/011; G06F 3/167; G06F 40/30; G06F 1/1605; G06F 9/453; G02B 30/56; G02B 30/54
See application file for complete search history.

(56) References Cited

U.S. PATENT DOCUMENTS

| | | | | |
|---|---|---|---|---|
| 7,253,817 | B1* | 8/2007 | Plantec | G06Q 30/02 |
| | | | | 345/418 |
| 8,707,179 | B2* | 4/2014 | Varela | H04N 21/4316 |
| | | | | 715/706 |
| 2005/0222846 | A1* | 10/2005 | Tomes | H04L 12/66 |
| | | | | 704/275 |
| 2006/0171008 | A1* | 8/2006 | Mintz | H04N 13/363 |
| | | | | 359/15 |
| 2008/0096533 | A1* | 4/2008 | Manfredi | G06N 3/006 |
| | | | | 455/412.1 |

(Continued)

Primary Examiner — Nicholas Klicos

(74) Attorney, Agent, or Firm — Patterson + Sheridan, LLP

(57) ABSTRACT

Techniques for improved interactive devices are provided. Input is received from a user, where the input includes a first request. The input is evaluated using one or more natural language processing techniques to determine a context of the input, and a response to the input is generated based at least in part on the determined context. A first virtual character of a plurality of virtual characters is selected based at least in part on the determined context. The first virtual character is displayed on a rotating display, and the generated response is implemented while the first virtual character is being displayed.

20 Claims, 9 Drawing Sheets

(56) References Cited

U.S. PATENT DOCUMENTS

| | | | | |
|---|---|---|---|---|
| 2010/0318520 | A1* | 12/2010 | Loeb | G06F 16/4393 |
| | | | | 707/743 |
| 2011/0242134 | A1* | 10/2011 | Miller | G06T 19/006 |
| | | | | 345/633 |
| 2012/0330791 | A1* | 12/2012 | Stevenson | G06N 3/006 |
| | | | | 705/26.61 |
| 2013/0124242 | A1* | 5/2013 | Burke | H04N 21/4307 |
| | | | | 705/7.12 |
| 2013/0267319 | A1* | 10/2013 | Kuhn | G06N 3/006 |
| | | | | 463/34 |
| 2014/0365407 | A1* | 12/2014 | Brown | G06F 16/63 |
| | | | | 706/11 |
| 2015/0037771 | A1* | 2/2015 | Kaleal, III | G09B 5/02 |
| | | | | 434/257 |
| 2015/0186156 | A1* | 7/2015 | Brown | G06F 9/453 |
| | | | | 715/706 |
| 2016/0086500 | A1* | 3/2016 | Kaleal, III | G06T 19/00 |
| | | | | 434/257 |
| 2017/0006334 | A1* | 1/2017 | Beckett | H04N 21/2187 |
| 2018/0358009 | A1* | 12/2018 | Daley | G06F 3/167 |
| 2018/0366118 | A1* | 12/2018 | Lovitt | G06F 16/635 |
| 2019/0138266 | A1* | 5/2019 | Takechi | G06F 3/167 |
| 2019/0206411 | A1* | 7/2019 | Li | G06F 3/167 |
| 2020/0090662 | A1* | 3/2020 | Castro | G10L 15/28 |

* cited by examiner

DIGITAL COMPANION DEVICE WITH DISPLAY

CROSS-REFERENCE TO RELATED APPLICATIONS

This application claims benefit of U.S. provisional patent application Ser. No. 62/626,574 filed Feb. 5, 2018, which is herein incorporated by reference in its entirety.

BACKGROUND

Embodiments presented in this disclosure generally relate to interactive devices. More specifically, embodiments disclosed herein relate to companion devices configured to enable a cohesive and immersive user experience.

The Internet of Things (IoT) has expanded dramatically in recent years. Generally, the IoT refers to a network of physical devices (often referred to as IoT devices or smart devices) with computing capability included in them. For example, smart devices have become increasingly common in modern households. These smart devices can often be activated and deactivated wirelessly, for example from a mobile phone or other device. Smart devices frequently serve utilitarian roles in modern houses. For example, smart locks can automatically lock your doors when you leave the house, intelligent thermostats can adjust the temperature when you are gone, and smart lights can turn on your lights when you return home.

Smart assistants have also increased in popularity recently. These virtual assistants serve similar utilitarian functions, such as checking local weather. Some virtual assistants can also interface with one or more smart devices, such that the virtual assistant can control the smart device at the behest of the user. Given the ever-increasing number of smart devices that play a part in our daily lives, there is a need for a unified system that integrates the disparate capabilities of each device into a cohesive and immersive experience for the user.

SUMMARY

According to one embodiment disclosed herein, a method is provided. The method includes receiving, by a companion device, input from a user, wherein the input includes a first request. The method also includes evaluating the input using one or more natural language processing (NLP) techniques to determine a context of the input. Additionally, a response to the input is generated based at least in part on the determined context. The method further includes selecting a first virtual character of a plurality of virtual characters based at least in part on the determined context, and displaying the first virtual character on a rotating display. Additionally, the method includes implementing the generated response while the first virtual character is being displayed.

According to a second embodiment disclosed herein, a companion device is provided. The companion device includes one or more computer processors, and a memory containing a program which when executed by the one or more computer processors performs an operation. The operation includes receiving, by a companion device, input from a user, wherein the input includes a first request. The operation also includes evaluating the input using one or more natural language processing (NLP) techniques to determine a context of the input. Additionally, a response to the input is generated based at least in part on the determined context. The operation further includes selecting a first virtual character of a plurality of virtual characters based at least in part on the determined context, and displaying the first virtual character on a rotating display. Additionally, the operation includes implementing the generated response while the first virtual character is being displayed.

According to a third embodiment disclosed herein, a computer product is provided. The computer program product includes logic encoded in a non-transitory medium, which is executable by operation of one or more computer processors to perform an operation. The operation includes receiving, by a companion device, input from a user, wherein the input includes a first request. The operation also includes evaluating the input using one or more natural language processing (NLP) techniques to determine a context of the input. Additionally, a response to the input is generated based at least in part on the determined context. The operation further includes selecting a first virtual character of a plurality of virtual characters based at least in part on the determined context, and displaying the first virtual character on a rotating display. Additionally, the operation includes implementing the generated response while the first virtual character is being displayed.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

In embodiments of the present disclosure, one or more virtual assistants can be used to control various smart devices in and around a user's house. For example, in an embodiment, smart switches can be activated and deactivated, often wirelessly. Similarly, in some embodiments, smart lights (such as lightbulbs, lamps, and the like) can be remotely controlled in order to adjust the brightness or intensity of the light as well as the color of the light. For example, a smart LED device can be instructed to turn on and off on command or at specified times, and at a defined brightness and hue. Other exemplary smart devices that can be utilized in embodiments of the present disclosure include speakers and other audio devices, display devices, and interactive devices such as action figures, toys, stuffed animals, and the like.

In existing systems, voice assistants provide unremarkable and impassive services, such as turning lights on and off according to a schedule defined by the user, or on command. Embodiments of the present disclosure provide cohesive and immersive experiences through a more interactive and dynamic assistant or character. In one embodiment, a display device is used to orchestrate any number of other devices in a space in order to create a thematic experience. For example, based on media (e.g., music, video, audio, games, etc.) being played or displayed to users, lights, speakers, and the like can be controlled to reflect a common theme that immerses the user in the media.

Figure 1:
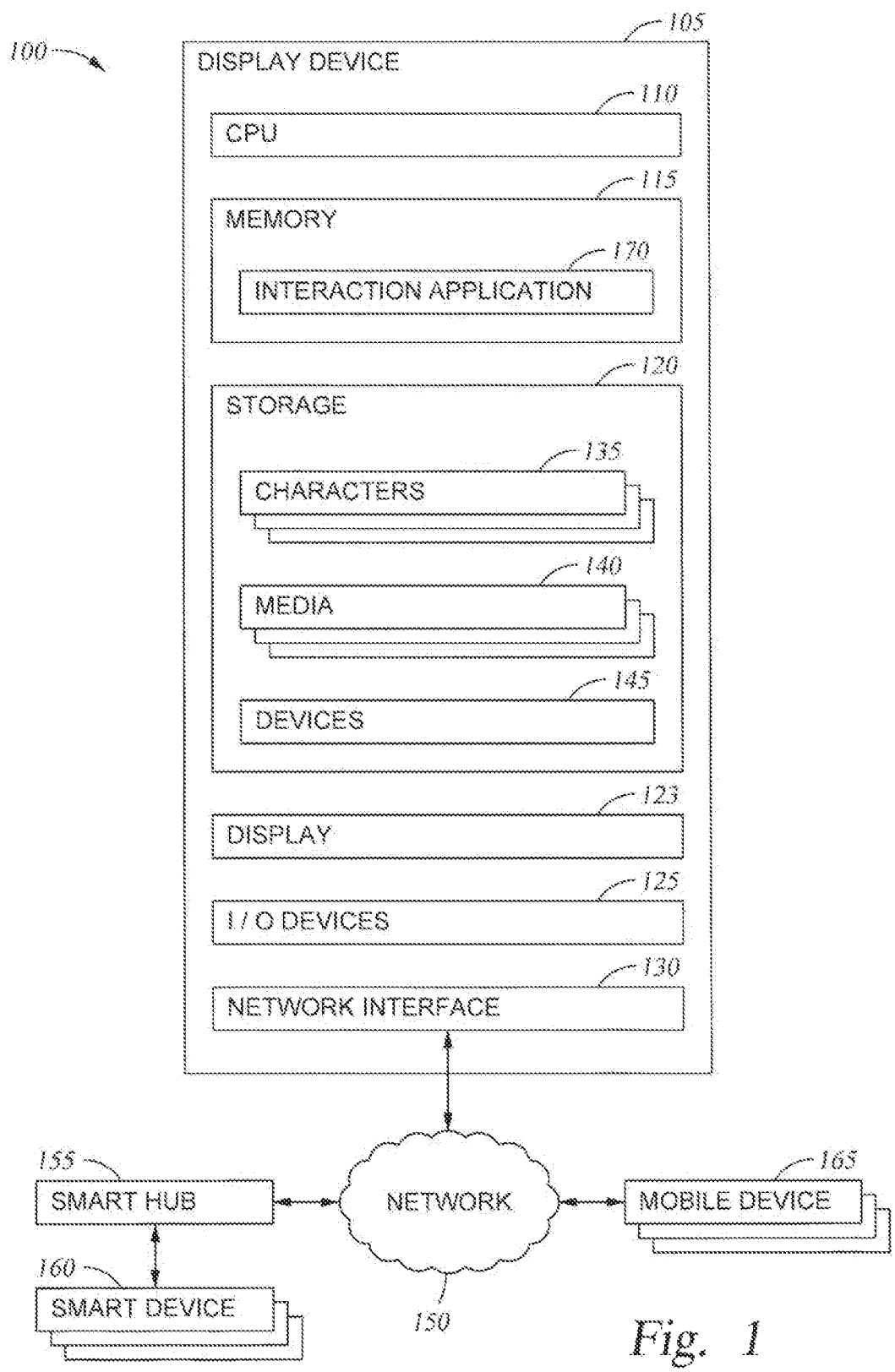
FIG. 1 is a block diagram illustrating a system capable of implementing one embodiment of the present disclosure disclosed herein.

FIG. 1 is a block diagram illustrating a system 100 capable of implementing one embodiment of the present disclosure. In the illustrated embodiment, the Display Device 105 controls and orchestrates the thematic experience for the user(s). As illustrated, Display Device 105 contains CPU 110, Memory 115, Storage 120, Display 123, I/O Devices 125, and Network Interface 130. In the illustrated embodiment, CPU 110 retrieves and executes programming instructions stored in Memory 115 as well as stores and retrieves application data residing in Storage 120. CPU 110 is representative of a single CPU, multiple CPUs, a single CPU having multiple processing cores, and the like. Memory 115 is generally included to be representative of a random access memory. Storage 120 may be a disk drive or flash-based storage device, and may include fixed and/or removable storage devices, such as fixed disk drives, removable memory cards, or optical storage, network attached storage (NAS), or storage area-network (SAN). One of ordinary skill in the art will appreciate that one or more components of Display Device 105 may be located remotely and accessed via a network.

Although not illustrated, in some embodiments, Display Device 105 also includes other processing units, such as one or more graphics processing units (GPU). In various embodiments, I/O devices include devices or modules used to provide input or output to and from the Display Device 105. For example, in some embodiments, one or more buttons, a keyboard, a mouse, and the like may be used to provide input. Similarly, in some embodiments, Display Device 105 may include one or more lights, speakers, displays, and the like to provide output to users. In the illustrated embodiment, the Display Device 105 includes a Display 123 that is used to create a floating image, video, or animation. For example, in one embodiment, the Display 123 includes a rotating mirror, screen, or display that is used to provide a three-dimensional holographic image or video stream. For example, in some embodiments, video can be displayed on a spinning screen such that it appears to illustrate a holograph or hologram that can be seen from all sides. In various embodiments, the Display 123 can include text, images, video, and the like.

In some embodiments, the hologram is visible from each orientation around the device and presents the same view of the holographic object regardless of which side it is viewed from. For example, in an embodiment depicting a virtual character as a three-dimensional hologram, the character may appear to remain facing towards the user, regardless of where the user moves in the room. In other embodiments, the images displayed on the screen can be synchronized with the spinning of the Display 123 (e.g., the refresh rate of the Display 123 can be synchronized with the spinning of the Display 123), such that users can see a three-dimensional representation of the depicted object from various angles. In such an embodiment, different angles or views of the object can be seen by moving between different orientations around the device. For example, in such an embodiment, users can move around the device and see the depicted characters or figures from different angles, such as from the front, sides, and behind the depicted element.

In one embodiment, once a minimum rotations per minute (RPM) is achieved for rotating the Display 123, the refresh rate of the Display 123 is increased. For example, the Display 123 may initially operate at a first refresh rate, and once the Display 123 reaches or exceeds 24 Hz, the Display 123 can be configured to operate at a second refresh rate that is higher relative to the first refresh rate. As an example, the Display 123 could initially operate at 60 Hz and the refresh rate could be increased to a refresh rate that is significantly greater than 60 Hz, once the RPM exceeds a predefined threshold. In a particular embodiment the Display Device 105 includes two Displays 123 that are aligned in a back-to-back configuration with the display screens facing outwards. In such an embodiment, the Display Device 105 can then synchronize the refresh rates of the two display screens, such that they fire precisely at half the interval of one another. In one embodiment, once the required refresh rate and RPMs are achieved, the Display Device 105 could use a directional marker to know and time each image based on the direction a particular one of the display screens is facing at a given moment in time. For example, the Display Device 105 could be configured with a sensor (e.g., Hall effect and magnet, infrared (IR) emitter/receiver, etc.) that can detect when a particular display screen is facing in a particular direction. In a particular embodiment, the Display Device 105 could be configured with a motor that performs the rotation and that is configured to provide a directional output.

In the illustrated embodiment, the Display Device 105 communicates using Network Interface 130 with various Smart Devices 160 and Mobile Devices 165 via a Network 150, which may be wired, wireless, or a combination thereof. For example, in some embodiments, as will be discussed in more detail below, users may use individual Mobile Devices 165 (such as mobile telephones, laptops, tablets, and the like) to communicate with the Display Device 105. Generally, Smart Devices 160 include IoT devices like smart switches, lightbulbs, televisions and other displays, speakers, and the like. In the illustrated embodiment, the Smart Devices 160 communicate with the Display Device 160 via a Smart Hub 155. In some embodiments, however, one or more Smart Devices 160 may communicate with the Display Device 105 without the need for the Smart Hub 155. In some embodiments, Smart Devices 160 also include interactive devices or toys like action figures and stuffed animals that are configured to communicate with the Display Device 105 and perform actions like movement and audio output.

In the illustrated embodiment, Memory 115 includes an Interaction Application 170. Although illustrated as residing in memory, in embodiments, the Interaction Application 170 may be implemented in hardware, software, or a combination of both, and may reside locally, in the cloud, or on any suitable device. The Interaction Application 170 can receive commands from users (e.g., verbal commands) and perform actions in response to those instructions, as will be discussed in more detail below. As illustrated, Storage 120 includes multiple Characters 135 and Media 140. Of course, in various embodiments these could also be stored in Memory 115 or elsewhere. Storage 120 also includes records of Devices 145 that can be communicated with by the Display Device 105. In an embodiment, Devices 145 includes a reference to each Smart Device 160, as well as the available actions or effects. For example, a record in Devices 145 representing a smart lightbulb could include an indication of how to communicate with the bulb (e.g., a network address) and a list of commands (e.g., turn on/off, set brightness, set color, etc.).

In one embodiment, the Display Device 105 is configured to interact and complement other entertainment systems and devices. For example, in a particular embodiment, the Display Device 105 could interface with other entertainment systems and devices using a remote control Application Program Interface (API) provided by the other entertainment systems and devices (e.g., an interface used by universal remote controls). Additionally, the Display Device 105 could facilitate the streaming of media content (e.g., streaming music, streaming video, etc.) to other devices (e.g., television devices) within the physical environment.

In some embodiments, the Interaction Application 170 interacts with users as a particular virtual character or individual, such as a character from a movie or video game. In such an embodiment, each "personality" may be stored as a Character 135. In an embodiment, each Character 135 includes a representation of what the Character 135 looks like (e.g., one or more images or video), as well as what the Character 135 sounds like (e.g., a voice model or snippets of audio). In various embodiments, each Character 135 may also include other information such as the personality of the character, name of the character, trivia about the character, media or themes that are related to the character, and the like.

In an embodiment, the Display Device 105 may display images or video of the appropriate Character 135, such as using a three-dimensional Display 123 as discussed above. For example, if a user addresses the Display Device 105 by name, the Character 135 associated with that name may be displayed and the Display Device 105 can respond to the user in the voice of that Character 135. Similarly, in an embodiment, an appropriate Character 135 can be selected and displayed based on the request of the user. For example, if the user asks the Display Device 105 to implement a winter theme, a snowman character can be displayed while the lights adjust to a wintery hue and brightness and the speakers output various wintery sound effects and music. As another example, if the user asks the Display Device 105 to play a particular movie, a character from that movie can be selected and displayed to interact with the user while the lights are dimmed.

In one embodiment, Media 140 includes information about the various multimedia that the Interaction Application 170 can interact with. For example, Media 140 may include movies, videos, songs, books, and the like, as will be discussed in more detail below. Similarly, in some embodiments, the Media 140 includes themes that can be implemented by the Display Device 105. For example, the Interaction Application 170 may communicate with the various Smart Devices 160 to adjust the lighting and sound effects of the physical space to represent particular themes, thereby leading to increased immersion of the users. In embodiments, the Interaction Application 170 can access Media 140 stored in any suitable location, including locally, on one or more remote devices, in the cloud, and the like.

Embodiments of the present disclosure provide immersive experiences to users via Display Device 105 and any available Smart Devices 160 and/or Mobile Devices 165. In some embodiments, the interaction described herein can be implemented by the Display Device 105 alone without the need for any other devices. For example, in an embodiment, the Display Device 105 includes one or more lights, speakers, displays, and the like. In various embodiments, the interactive experiences that can be created by the Display Device 105 can include utility actions, hosted multimedia (e.g., movies, videos, and songs), hosted gameplay, implementing themes, sing-alongs, interactive story time, and the like. Each of these embodiments is discussed in more detail below with reference to FIGS. 2-7.

Figure 2:
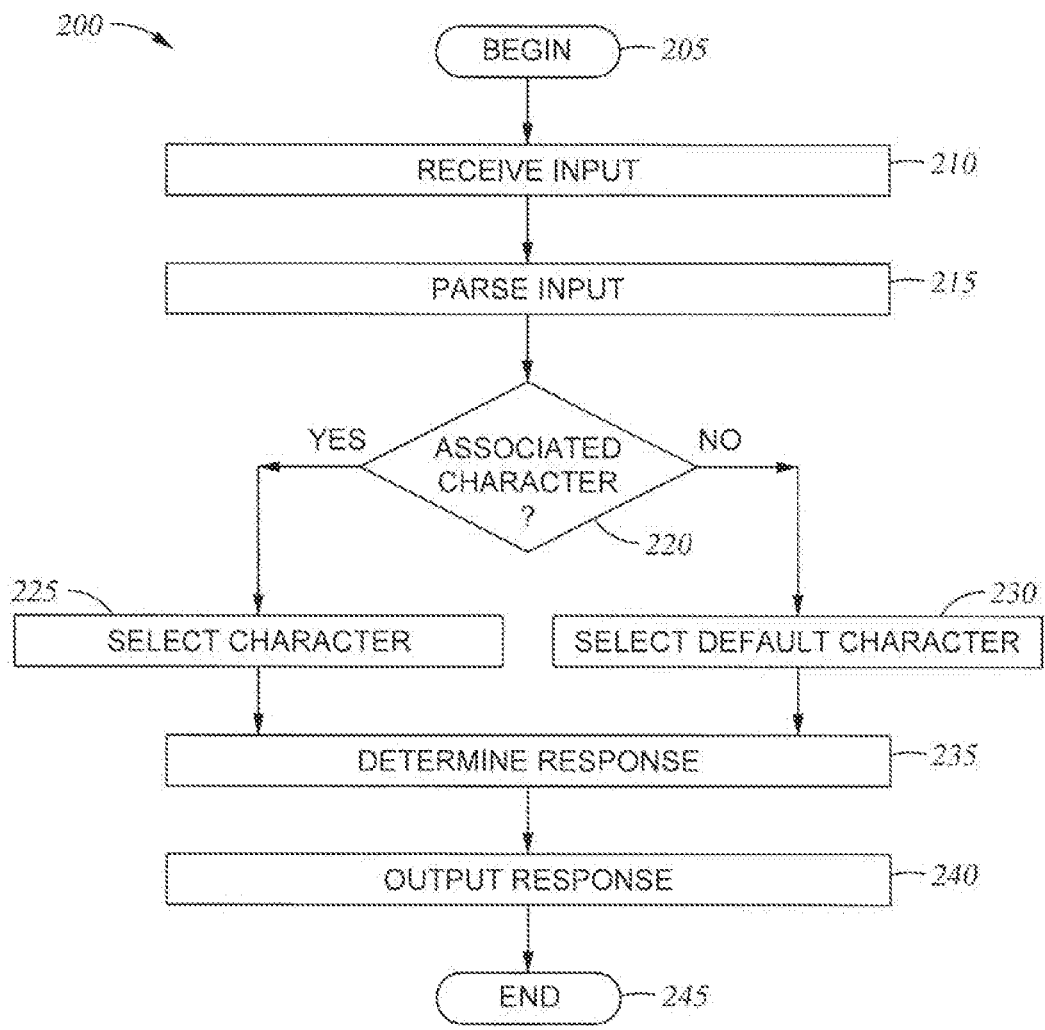
FIG. 2 is a flow diagram illustrating a method of providing an immersive experience to users, according to one embodiment described herein.

FIG. 2 is a flow diagram illustrating a method 200 of providing an immersive experience to users, according to one embodiment described herein. The illustrated method 200 is used to provide generic or functional interaction with a user, such as utility actions. As used herein, utility actions can include things like connecting to and playing media, creating and modifying calendar reminders, setting alarms and timers, checking the time, date, and weather, and searching for answers to various questions. The method 200 begins at block 205. At block 210, the Display Device 105 receives input from one or more users. For example, the input can be provided as verbal command or instruction, written or textual request (e.g., via a Mobile Device 165), and the like. At block 215, the Display Device 105 parses the input using one or more natural language processing algorithms. In some embodiments, if the input is verbal, the Display Device 105 also utilizes one or more speech-to-text models to generate a textual representation of the input.

In some embodiments, the Display Device 105 parses the input locally without the need for other devices. In some embodiments, however, the input may be transmitted to one or more remote servers (e.g., in the cloud) to parse. This may be because the computing resources required to parse the input are greater than the Display Device 105 can provide, or because the algorithms used to parse the input are only available on the remote device(s). At block 220, the Display Device 105 determines whether there is a particular Character 135 associated with the received input. For example, if the user addressed a particular character, the appropriate Character 135 should be used to respond. Similarly, the input may have an associated Character 135 based on other content of the input. For example, if the user is asking about the weather, a first Character 135 (e.g., a weather related character) may be selected while a second Character 135 may be in charge of calendar modifications.

In some embodiments, Characters 135 have predefined associations or connections with particular contexts or contents of the input requests. In some embodiments, the appropriate character is selected based at least in part on the generated output or response. For example, in one embodiment, if the user asks about the weather and the response indicates that it is cold or snowy, the Display Device 105 may select a character associated with winter or the snow (such as a snowman character). Similarly, in one embodiment, the character can be selected based on the input (e.g., a weather person is identified) and their appearance, mannerisms, and the like can be modified based on the determined response (e.g., the character is rendered wearing a hat and parka, or shivering in the cold).

If, at block 220, the Display Device 105 determines that a particular Character 135 should be used, the method 200 proceeds to block 225 where that identified Character 135 is selected. If the Display Device 105 determines that no particular character is associated with the input, however, the method 200 proceeds to block 230 where a default character is selected. Regardless of whether a particular character is selected, the method 200 then proceeds to block 235, where the Display Device 105 determines the appropriate response(s) based on the parsed input. For example, if the user is asking about the weather, the Display Device 105 may transmit a request to a weather server.

In some embodiments, the selected character may be based at least in part on the determined response. For example, if the input included a question about the weather and the response included an indication that it will be warm and sunny, the Display Device 105 may select a character who is associated with warm weather or the beach. In a related embodiment, the selected character may remain the same, but the character may be presented differently (e.g., with different clothes or mannerisms) based on the determined response. The method 200 then proceeds to block 240, where the determined response is outputted to the user(s). In various embodiments, this may include audio output (e.g., using text-to-speech), written output, and the like. In an embodiment, the displayed Character 135 may move and appear to be speaking to the user(s). Similarly, in some embodiments, one or more Smart Devices 160 may be utilized to provide output (e.g., by adjusting the lighting, or by having an interactive toy output its own response to the determined response). The method 200 then proceeds to block 245, where it ends.

Figure 3:
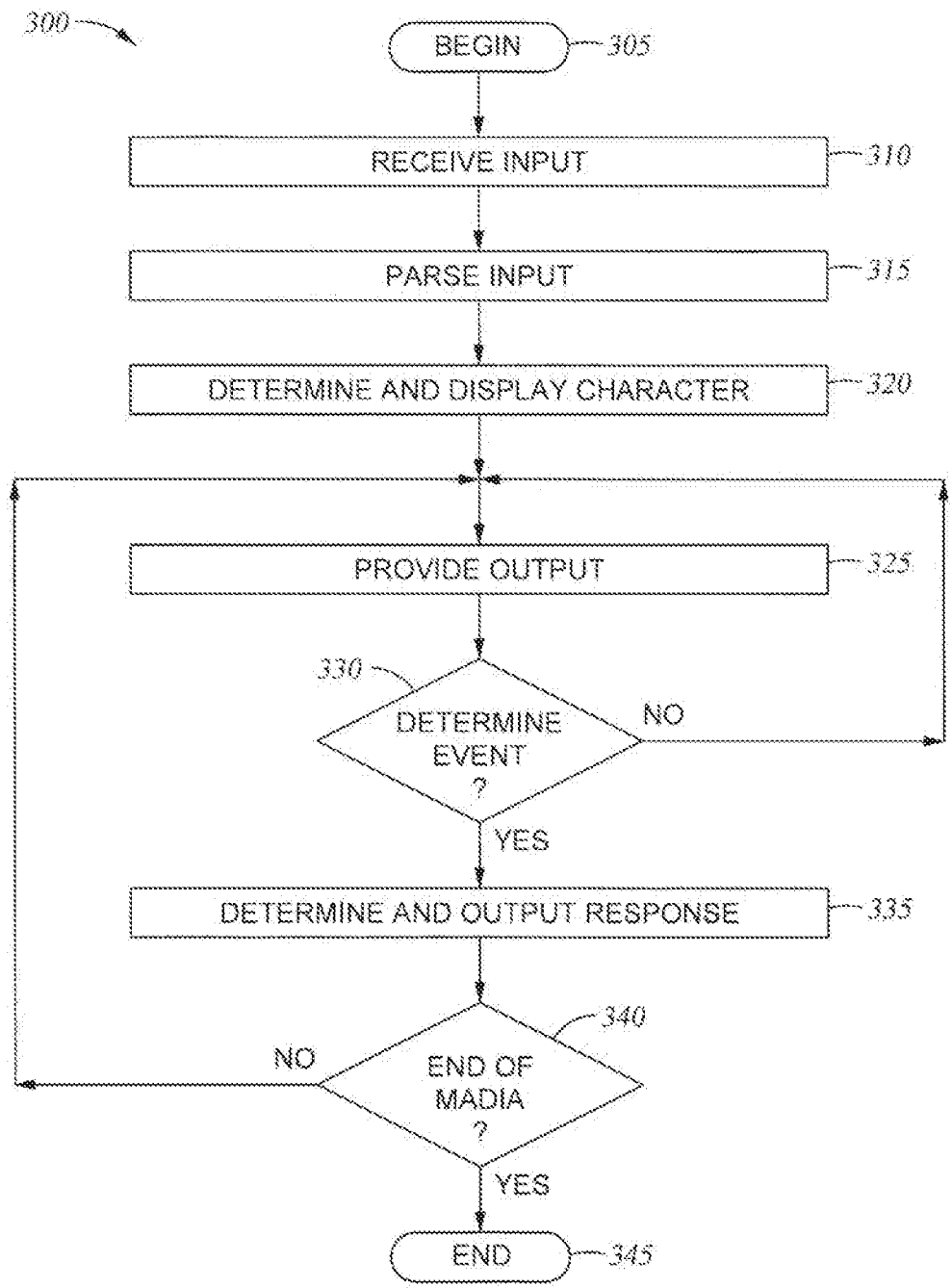
FIG. 3 is a flow diagram illustrating a method of providing an immersive experience to users, according to one embodiment described herein.

FIG. 3 is a flow diagram illustrating a method 300 of providing an immersive experience to users, according to one embodiment described herein. The illustrated method 300 is used to provide an immersive experience that includes enhanced multimedia. The method 300 begins at block 305. At block 310, the Display Device 105 receives input from one or more users. For example, the input can be provided as verbal command or instruction, written or textual requests (e.g., via a Mobile Device 165), and the like. At block 315, the Display Device 105 parses the input using one or more natural language processing algorithms. In some embodiments, if the input is verbal, the Display Device 105 also utilizes one or more speech-to-text models to generate a textual representation of the input.

At block 320, the Display Device 105 determines and displays an appropriate Character 135 based on the input. For example, if the user selected a particular movie, a character from the movie may be selected for display. Similarly, if the user indicated a particular category of shows or movies (e.g., pirates movies, horror movies, etc.), an appropriate character may be selected for each (e.g., a pirate character, a monster character, etc.). In some embodiments, each Character 135 may have knowledge limited to their universe or genre. For example, if a user requests that a pirate character find a space movie for them to watch, the pirate character may respond that they know nothing about that concept. In such an embodiment, another character may be suggested by the Display Device 105. Similarly, a character from a particular franchise may not be able to interact with media from other franchises.

At block 325, the Display Device 105 provides output to the user(s). For example, the selected character can be displayed and can communicate with the user that the media is being started. In some embodiments, the selected character may similarly talk about the media, such as by giving trivia or fun facts, or asking the user questions about it. For example, while a movie is being retrieved and started, a character from the movie can be displayed and can engage the user in small talk about the movie. In addition, the Display Device 105 may provide other output as well. For example, in an embodiment, the Display Device 105 can instruct a smart television or other display to begin playing the selected multimedia. In some embodiments, other Smart Devices 160 may also be adjusted, such as by lowering the brightness of the lights or turning them off, and turning down or muting any music or sound effects playing.

In some embodiments, the selected character may remain displayed as if they are watching the multimedia with the user(s). For example, the character may be animated to turn towards the display, eat popcorn, and the like. In other embodiments, the character may no longer be displayed once the media begins. In an embodiment, this may be determined at least in part based on the input provided by the user(s) or be otherwise determined by the users. For example, if the user asks the character to watch the movie with them, the character may be animated and displayed throughout the movie. If the user simply requests that the character play a movie for them, the character may interact with the user while the movie is being retrieved, and then disappear.

The method 300 then proceeds to block 330, where the Display Device 105 determines whether a predefined event is detected. The Display Device 105 may detect events in a variety of ways. In one embodiment, the Display Device 105 retrieves metadata associated with the multimedia, where the metadata describes the context at various timestamps. For example, the metadata may describe the scene (e.g., the time of day, location, weather, and the like). In a related embodiment, the metadata also includes information about characters present at a particular point in time, events or actions that are occurring, and the like.

In some embodiments, rather than rely on metadata, the Display Device 105 may detect predefined events in other ways. For example, in an embodiment, the Display Device 105 analyzes audio information associated with the media (either transmitted to the Display Device 105 directly, or audio captured through one or more microphones). In such an embodiment, the Display Device 105 can detect and identify predefined events or contexts based on the sound they make (e.g., thunder, explosions, music, a beach scene, and the like) and respond appropriately. Similarly, in one embodiment, the Display Device 105 analyzes video information (either transmitted to the Display Device 105, or captured via one or more cameras) and detects defined events or context.

If a predefined event is not detected at block 330, the method 300 returns to block 325 (e.g., the media continues to play uninterrupted). If the Display Device 105 determines that a defined event is occurring, is about to occur, or just occurred, however, the method 300 proceeds to block 335, where the Display Device 105 determines and outputs an appropriate response. In an embodiment, the Display Device 105 can adjust one or more lights (either on the Display Device 105 or on a Smart Device 160) based on a predefined relationship between the detected event and the output. For example, if lightning or thunder is detected, the Display Device 105 may briefly flash the lights in a bright white. In a related embodiment, the Display Device 105 may adjust the output of the character to react to the event, such as by gasping, jumping backwards, dancing with the music, and the like. In some embodiments, the Display Device 105 may also instruct other interactive toys or devices (such as action figures or robots), as well as toy systems, to respond appropriately (e.g., by dancing to music, covering their eyes, cowering, or backing away from a scary scene, and the like).

In some embodiments, the Display Device 105 can be utilized for voice over internet protocol (VOIP) and/or video teleconferencing (VTC) communications. For example, in an embodiment, the Display Device 105 can make a VOIP or VTC communications connection to one or more mobile phones, tablets, computers, door bells, TVs, other Display Devices 105, and the like. In such an embodiment, audio and video can be transmitted and received between such types of devices. As an example, the speaker(s) of the Display Device 105 can play the audio captured and streamed from a mobile device, and similarly a mobile device can play audio captured and streamed from the Display Device 105. In embodiments, the same can be applied to video, where Display Device 105's spinning display projects captured and streamed video from a mobile device, and a mobile device can project video captured and streamed from one or more integrated or system connected camera(s) of the Display Device 105. In various embodiments, further computer vision techniques can be used and/or combined with speech recognition techniques to enhance this type of experience. For example the integrated or system connected camera of the Display Device 105, if combined with audio direction of arrival and/or image recognition, could narrow and focus its field of view to capture to the active speaking participant In some embodiments, the character displayed by the Display Device 105 may also provide commentary, trivia, and the like about the scene or media. In an embodiment, the user(s) can select whether the character provides such commentary, or how frequently the commentary should be provided. For example, in one embodiment, the selected Character 135 may provide fun facts about production of the movie or the scene which is being displayed. In some embodiments, the Character 135 does this without pausing or stopping the media. In other embodiments, the Character 135 can pause the media before speaking. In some embodiments, an indication can be provided to the user that the Character 135 has some commentary or input regarding the detected event, and the user can either ask the Character 135 to share this commentary, or ignore it.

After outputting the determined response, the method 300 proceeds to block 340 where the Display Device 105 determines whether the multimedia has ended. If not, the method returns to block 325 (e.g., the media continues playing). If the media has ended, however, the method 300 proceeds to block 345, where it ends. In an embodiment, the end of the media is also considered an "event" that triggers particular output. In some embodiments, after the multimedia has completed, the Display Device 105 may interact with the user about the media. For example, in an embodiment, the displayed character may ask the user how they liked the media, or what their favorite part was. In some embodiments, the user's response can be used to build a profile that allows the Display Device 105 to suggest movies or other media in the future, based on what the user has enjoyed in the past. In this way, the user's experience can be greatly enhanced.

Figure 4:
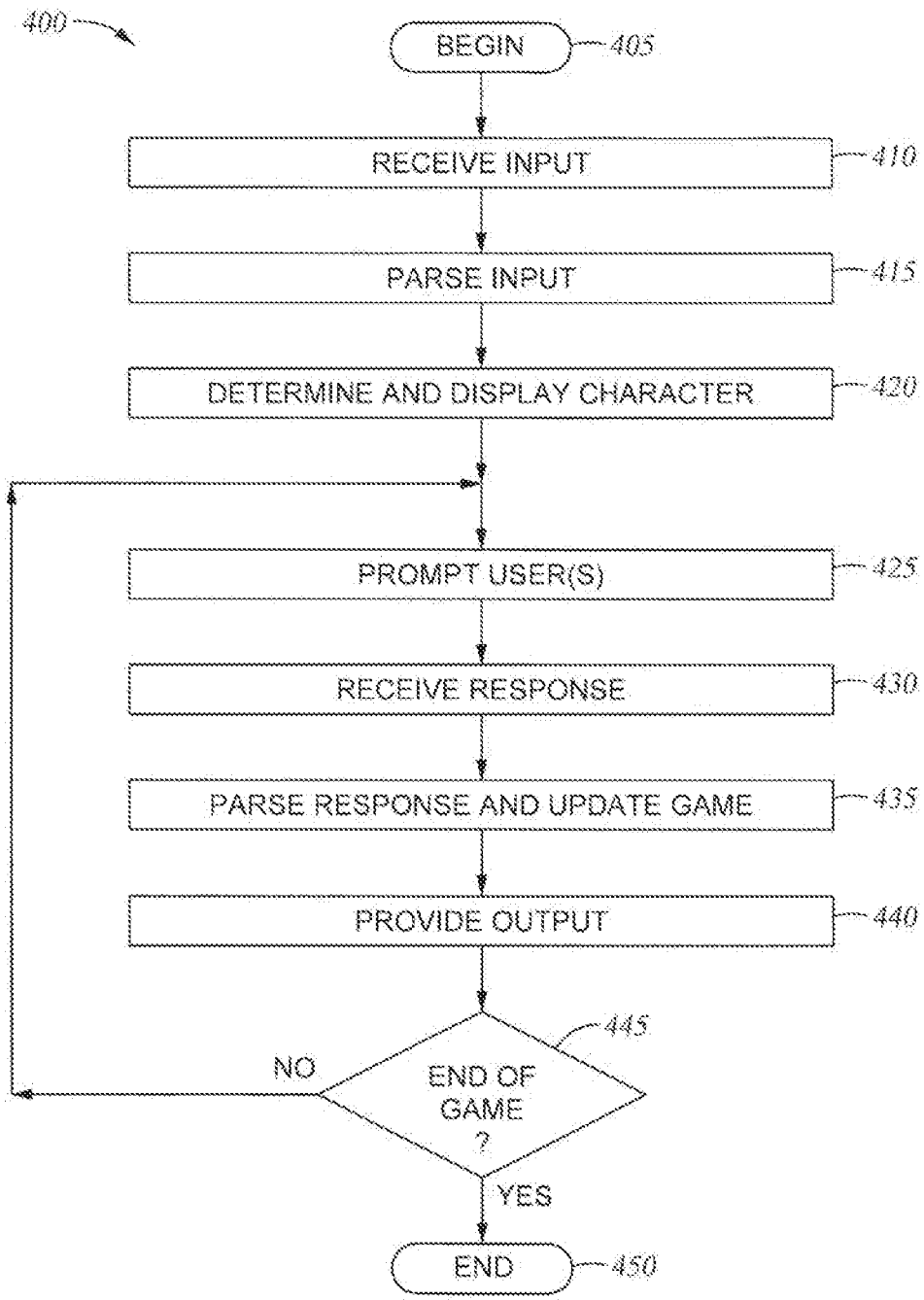
FIG. 4 is a flow diagram illustrating a method of providing an immersive experience to users, according to one embodiment described herein.

FIG. 4 is a flow diagram illustrating a method 400 of providing an immersive experience to users, according to one embodiment described herein. The illustrated method 400 is used to provide an immersive experience that includes hosted gameplay. The method 400 begins at block 405. At block 410, the Display Device 105 receives input from one or more users. For example, the input can be provided as verbal command or instruction, written (e.g., via a Mobile Device 165), and the like. At block 415, the Display Device 105 parses the input using one or more natural language processing algorithms. In some embodiments, if the input is verbal, the Display Device 105 also utilizes one or more speech-to-text models to generate a textual representation of the input.

At block 420, the Display Device 105 determines and displays an appropriate Character 135 based on the input. For example, if the input indicates a particular game that the user(s) want to play, the associated host character can be selected. In various embodiments, the selected Character 135 may also introduce themselves, ask the user(s) to introduce themselves, and the like. The method 400 then proceeds to block 425, where the Display Device 105 prompts the user(s) to provide input. For example, the character may ask a trivia question. At block 430, the Display Device 105 receives a response from each user. For example, the users may verbally give one or more answers, or may press a button or other input to indicate that they know the answer, and wait for the host character to address them. In some embodiments, the users may also use one or more Mobile Devices 165 or Smart Devices 160 to provide their answer, such as through multiple choice or writing or typing their response. In this way, each user can provide their response without the other users seeing or hearing it.

At block 435, the Display Device 105 parses the received response(s), and updates the game status. For example, the Display Device 105 may assign points based on the responses. The method 400 then proceeds to block 440, where the Display Device 105 provides output. For example, the host character may congratulate the users who responded appropriately, or lightly rebuke the players who did not. Similarly, the Display Device 105 may cause the lights to change colors and may output sound effects based on whether the response(s) were correct or not. The method 400 then proceeds to block 445, where the Display Device 105 determines whether the game has ended. If so, the method 400 terminates at block 450. If not, however, the method 400 returns to block 425, where the character prompts the user(s) again.

Although the above discussion related to trivia games, other games are of course implemented in various embodiments. For example, in embodiments, the Display Device 105 may be configured to play charades with the users, a drawing game, a "guess the song" game where a snippet of music is played and the users must guess, and the like. In some embodiments, the selected character remains displayed during the game, and interacts with the users to enhance their experience.

Figure 5:
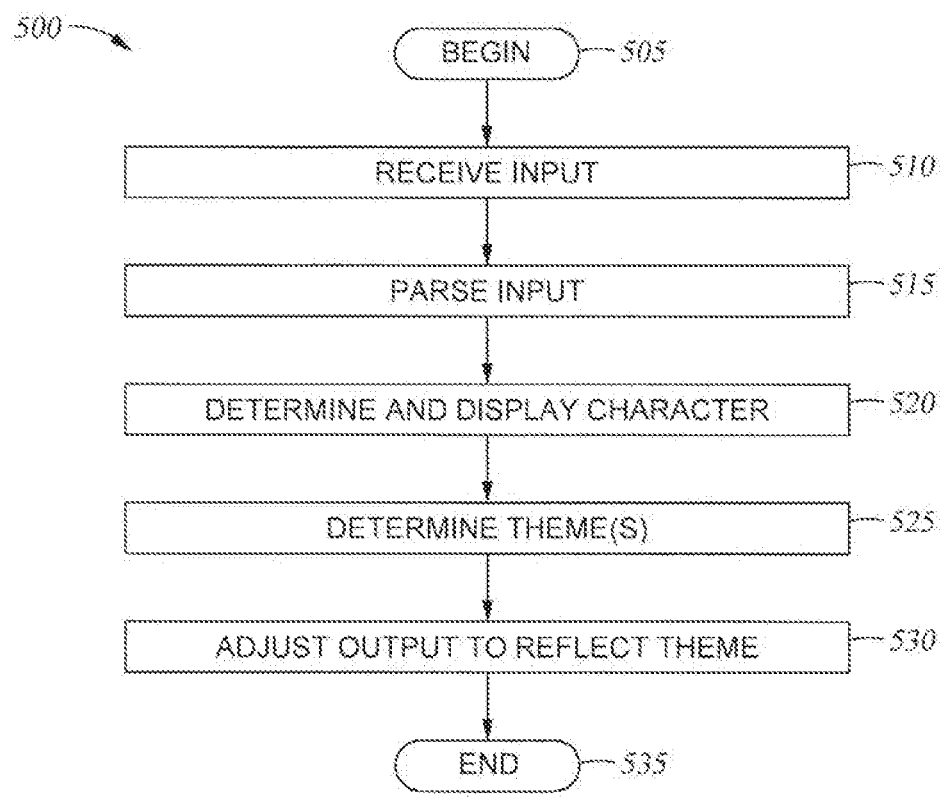
FIG. 5 is a flow diagram illustrating a method of providing an immersive experience to users, according to one embodiment described herein.

FIG. 5 is a flow diagram illustrating a method 500 of providing an immersive experience to users, according to one embodiment described herein. The illustrated method 400 is used to provide an immersive experience that includes implementing themes in the physical space. The method 500 begins at block 505. At block 510, the Display Device 105 receives input from one or more users. For example, the input can be provided as verbal command or instruction, written (e.g., via a Mobile Device 165), and the like. At block 515, the Display Device 105 parses the input using one or more natural language processing algorithms. In some embodiments, if the input is verbal, the Display Device 105 also utilizes one or more speech-to-text models to generate a textual representation of the input.

At block 520, the Display Device 105 determines and displays an appropriate Character 135 based on the input. In an embodiment, if the user requested that a particular theme be implemented, a character associated with that theme can be selected and displayed. For example, if the user(s) request a "pirate" theme, a pirate character can be displayed. Similarly, if the users request a theme associated with a particular movie, song, or franchise, an associated character can be displayed.

At block 525, the particular theme(s) are determined. For example, the user(s) may request a seasonal or holiday theme, a location-based theme, a theme based on a movie or franchise, and the like. As used herein, a theme refers to an arrangement of music, sound effects, and lighting effects that provide ambience and immersion. Themes are generally designed to provide the sensation of actually being in the relevant time and place, rather than simply playing background music. For example, a "seaside" theme may include ocean and seagull sound effects, wind noises, appropriate color and brightness of the lighting, and the like. In some embodiments, themes may also be subdivided into more specific themes (e.g., seaside at sunset, which could include dimmer and more red/orange light and different sound effects).

As an additional example, a "storm" theme could include occasional flashes of white light accompanied by thunder sound effects, as well as rain and wind sounds. Some themes also include snippets of music. For example, a theme may be associated with a particular theme park or amusement ride, and the theme can include the typical sounds and lighting, as well as snippets of the associated music. Similarly, themes based on particular movies such as a pirate movie may include a blend of ocean sounds, ships creaking, sails flapping, seagull sound effects, and segments or snippets of the associated musical score, as well as relevant lighting effects.

Once the appropriate theme has been determined, the method 500 proceeds to block 430, where the Display Device 105 adjusts the outputs to implement that theme. For example, as discussed above, the Display Device 105 may communicate with Smart Devices 160 like lightbulbs to adjust the lighting, as well as speakers for the audio effects. The method 500 then terminates at block 535.

Figure 6:
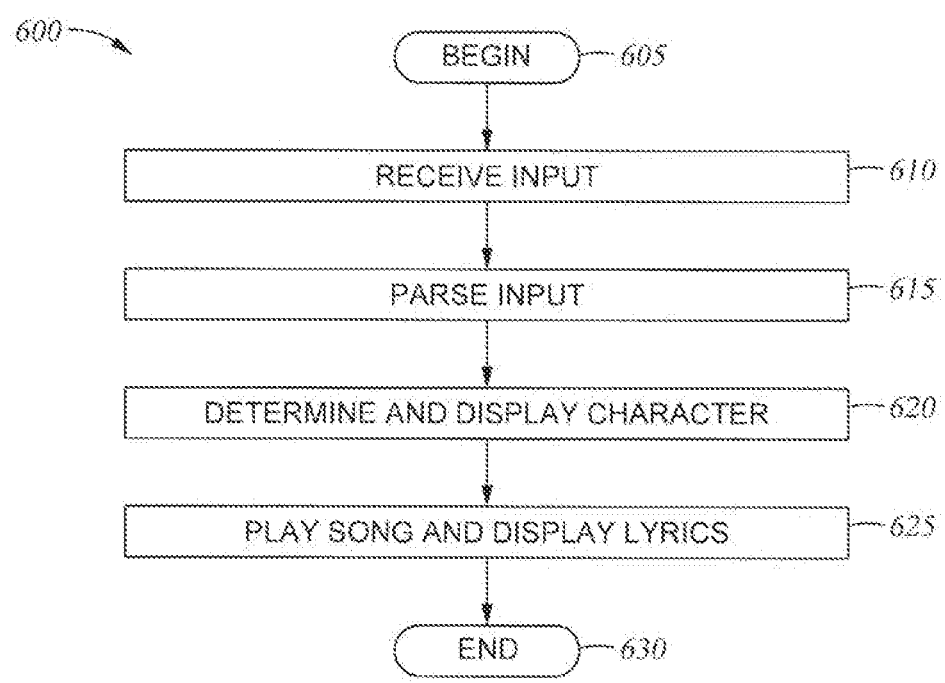
FIG. 6 is a flow diagram illustrating a method of providing an immersive experience to users, according to one embodiment described herein.

FIG. 6 is a flow diagram illustrating a method 600 of providing an immersive experience to users, according to one embodiment described herein. The illustrated method 400 is used to provide an immersive experience that includes implementing karaoke-style sing-alongs. The method 600 begins at block 605. At block 610, the Display Device 105 receives input from one or more users. For example, the input can be provided as verbal command or instruction, written (e.g., via a Mobile Device 165), and the like. At block 615, the Display Device 105 parses the input using one or more natural language processing algorithms. In some embodiments, if the input is verbal, the Display Device 105 also utilizes one or more speech-to-text models to generate a textual representation of the input.

At block 620, the Display Device 105 determines and displays an appropriate Character 135 based on the input. For example, if the selected song comes from a particular movie, the character who sings the song in the movie can be selected for display. The method 600 then proceeds to block 625, where the song is played and the lyrics are displayed to the user(s). In some embodiments, the selected character sings the song while the user(s) sing along with the character throughout. In a related embodiment, a user can sing the full song alone. In some embodiments, the user and the character may each sing portions of the song, alternating back and forth. Additionally, in some embodiments, each user sings a portion of the song in turn. In one embodiment, the displayed character is rendered such that it appears to turn towards the user who is currently singing or providing input. After the song has completed, the method 600 terminates at block 630. In some embodiments, the selected character may provide commentary or otherwise interact with the users throughout the song. For example, while the user is singing, the selected character may dance or cheer.

Figure 7:
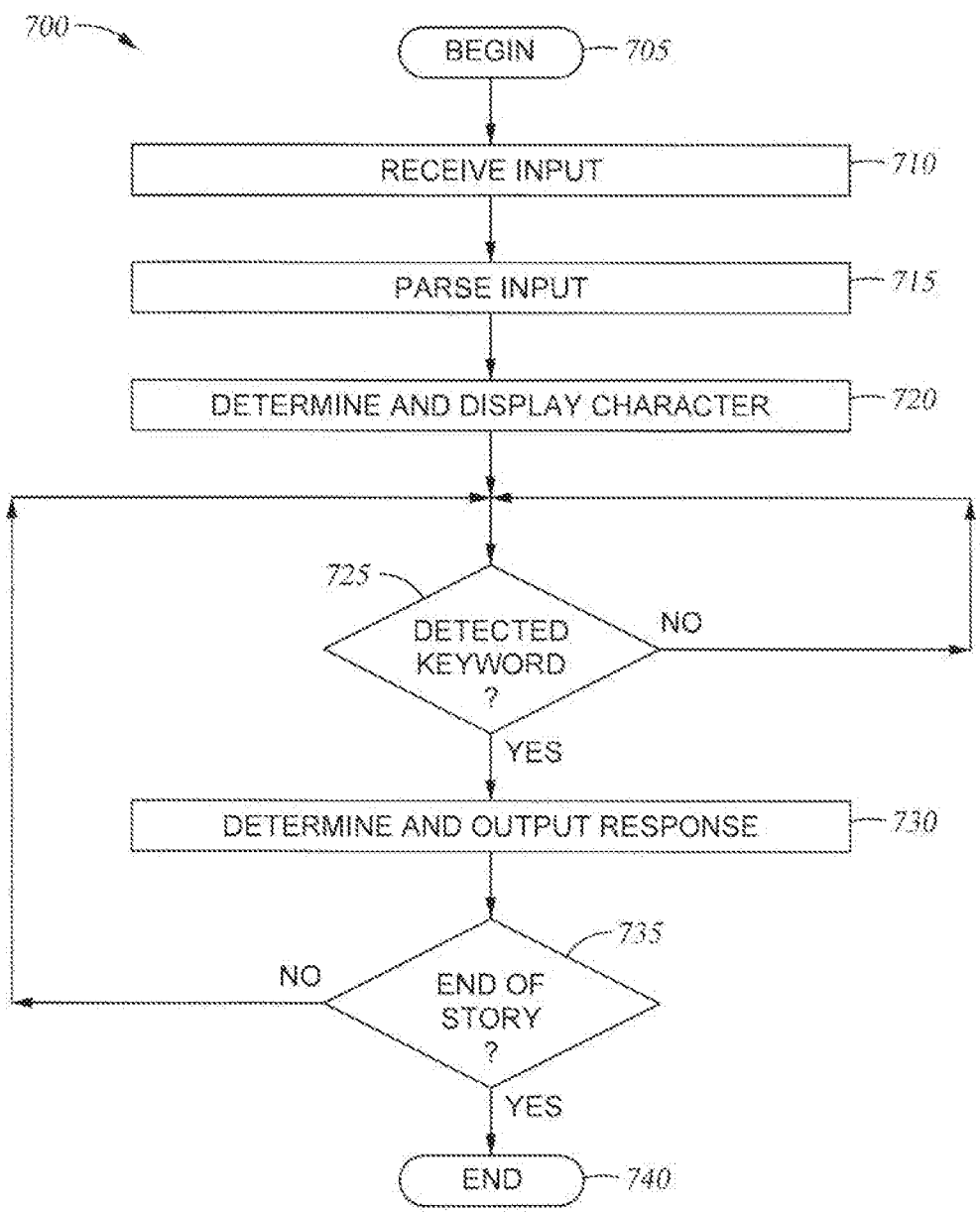
FIG. 7 is a flow diagram illustrating a method of providing an immersive experience to users, according to one embodiment described herein.

FIG. 7 is a flow diagram illustrating a method 700 of providing an immersive experience to users, according to one embodiment described herein. The illustrated method 700 is used to provide an immersive experience that includes interactive story telling. For example, a parent may read a story to their children, while the Display Device 105 enhances the story and provides for increased interaction. The method 700 begins at block 705. At block 710, the Display Device 105 receives input from one or more users. For example, the input can be provided as verbal command or instruction, written (e.g., via a Mobile Device 165), and the like. At block 715, the Display Device 105 parses the input using one or more natural language processing algorithms. In some embodiments, if the input is verbal, the Display Device 105 also utilizes one or more speech-to-text models to generate a textual representation of the input.

At block 720, the Display Device 105 determines and displays an appropriate Character 135 based on the input. For example, the Display Device 105 may select a particular character based on the book or story that the users want to read. In one embodiment, the user informs the Display Device 105 which book they are reading, for example by verbally stating the title. In some embodiments, the Display Device 105 may retrieve metadata about the book based on this input, such as from a remote server. In an embodiment, the associated metadata includes the full text of the book or story. In a related embodiment, the metadata may include only portions of the text. In some embodiments, the metadata includes predefined keywords or phrases in the text, along with a predefined action or output associated with each keyword or phrase.

In some embodiments, the Display Device 105 may provide an interactive and immersive story experience without retrieving associated metadata for each story or book. For example, in one embodiment, the Display Device 105 parses the speech from the user as they read the story, and identifies words or phrases with a predefined association to a particular output (e.g., without regard to the particular book or story that is being read). At block 725, the Display Device 105 determines whether a keyword or phrase has been detected. For example, as discussed above, in some embodiments the book or story may be associated with metadata that defines certain keyword or phrases paired with a particular output or response. In another embodiment, the Display Device 105 may access a set of predefined phrase/output pairings (either stored locally or from a remote server) that can be used regardless of the selected book or story.

If, at block 725, no keyword or phrase is detected, the method 700 loops until a keyword or phrase is detected or the story or book ends. If the Display Device 105 detects a predefined keyword or phrase, however, the method 700 proceeds to block 730, where the Display Device 105 determines the response (e.g., from the predefined pairing) and outputs the response. In various embodiments, the associated response can include adjusting the smart lights in the space, outputting an audio effect through one or more speakers, and the like. For example, a keyword may be "thunder," which triggers a brief flash of light and an associated thunder sound effect.

In addition, in some embodiments, the Display Device 105 can determine the context of a passage or scene based on the metadata or keywords used. For example, if the Display Device 105 determines that the passage currently being read relates to a quiet nighttime scene (e.g., from metadata associated with the passage, or by parsing the user's speech), the associated effect may include the sound of crickets or other insects and reducing the brightness of the lights. Similarly, particular passages may be associated with a particular musical score or melody playing in the background.

In an embodiment, the determined response also includes reactions by the character displayed by the Display Device 105, and/or the other interactive toys or devices available. For example, if the Display Device 105 determines that a scary or creepy part of the story is being read, the animated character may hide or cower. Similarly, if any physical devices such as action figures or toys are nearby, the Display Device 105 may instruct them to cover their eyes, shake, or otherwise appear to be nervous or scared. Additionally, in some embodiments, the selected character or interactive toys may make comments about the story based on the determined output (e.g., "I love this part!").

At block 735, the Display Device 105 determines whether the story has ended. If not, the method 700 returns to block 725 to detect additional keywords or phrases. If the story has ended, however, the method 700 terminates at block 740. Of course, the end of the story may also be an event that triggers one or more outputs. For example, in some embodiments, the selected character may comment about the story or ask the user whether they liked it. In this way, the users experience is greatly enhanced.

Figure 8:
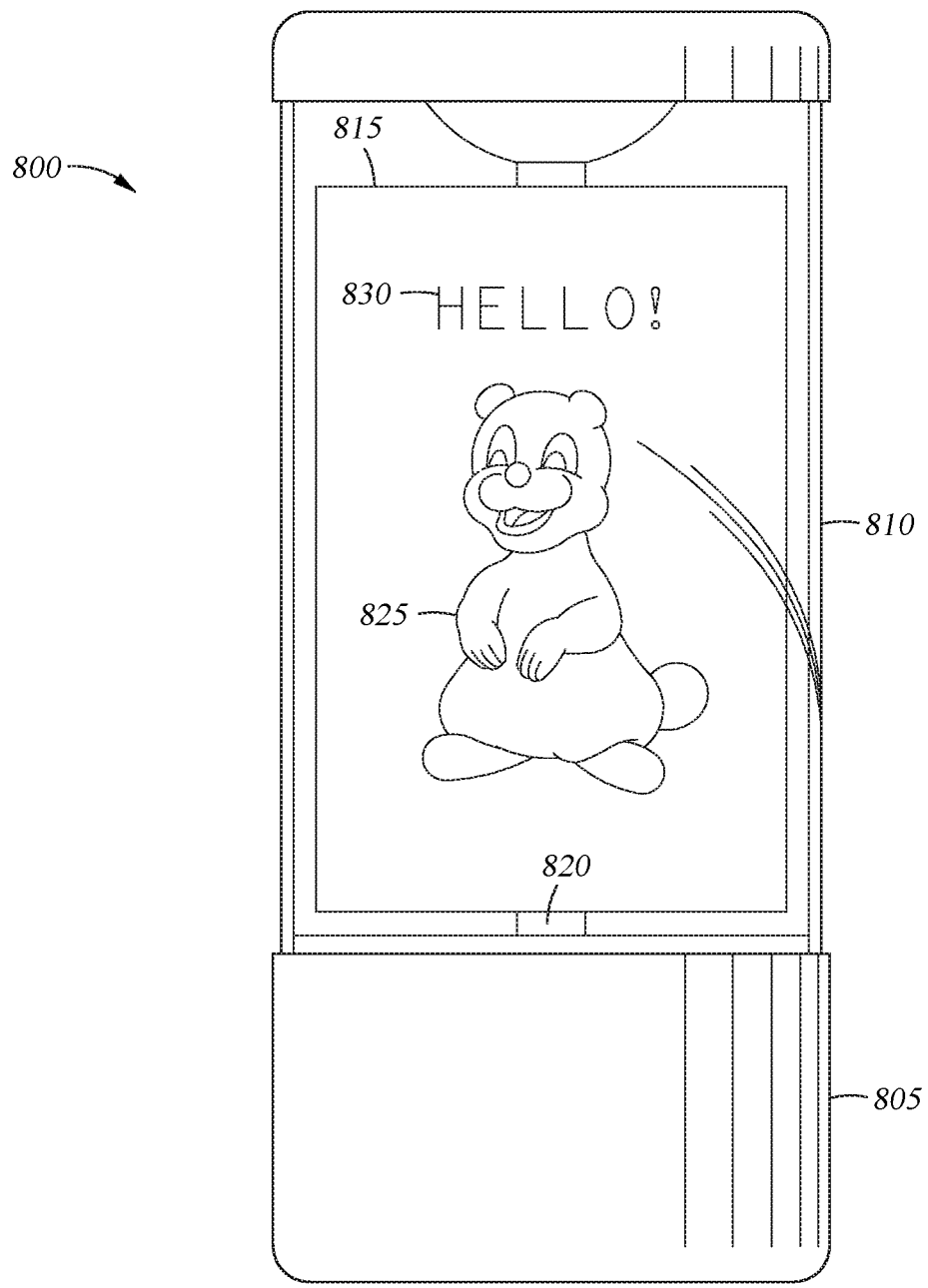
FIG. 8 illustrates a device configured to provide immersive experiences to users, according to one embodiment described herein.

FIG. 8 illustrates a Display Device 800 configured to provide immersive experiences to users, according to one embodiment described herein. As illustrated, the Display Device 800 includes a base portion 805, which houses some or all of the computing resources required to implement embodiments described herein. The Display Device 800 also includes a clear cylinder or dome 810, which encloses the spinning display for safety. In embodiments that utilize a physical safety barrier, any suitable barrier may be used to enable the displayed character to be visible without exposing the rotating surface to physical contact. The display 815 rotates on an axis 820 in the center of the Display Device 800. As illustrated, the display 815 is depicting a character 825. As explained above, in an embodiment, the display 815 spins to create the effect of a three-dimensional hologram (e.g., a character that appears to float above the base 805 of the Display Device 800). In this way, the character 825 appears to be three-dimensional, and can be easily seen by users regardless of which side of the Display Device 800 they are on. Additionally, as illustrated, the character 825 is talking with the user, and the display shows text 830 above the character's head. Of course, in some embodiments, the character's speech may be output as audio only, without the text 830 being displayed.

Figure 9:
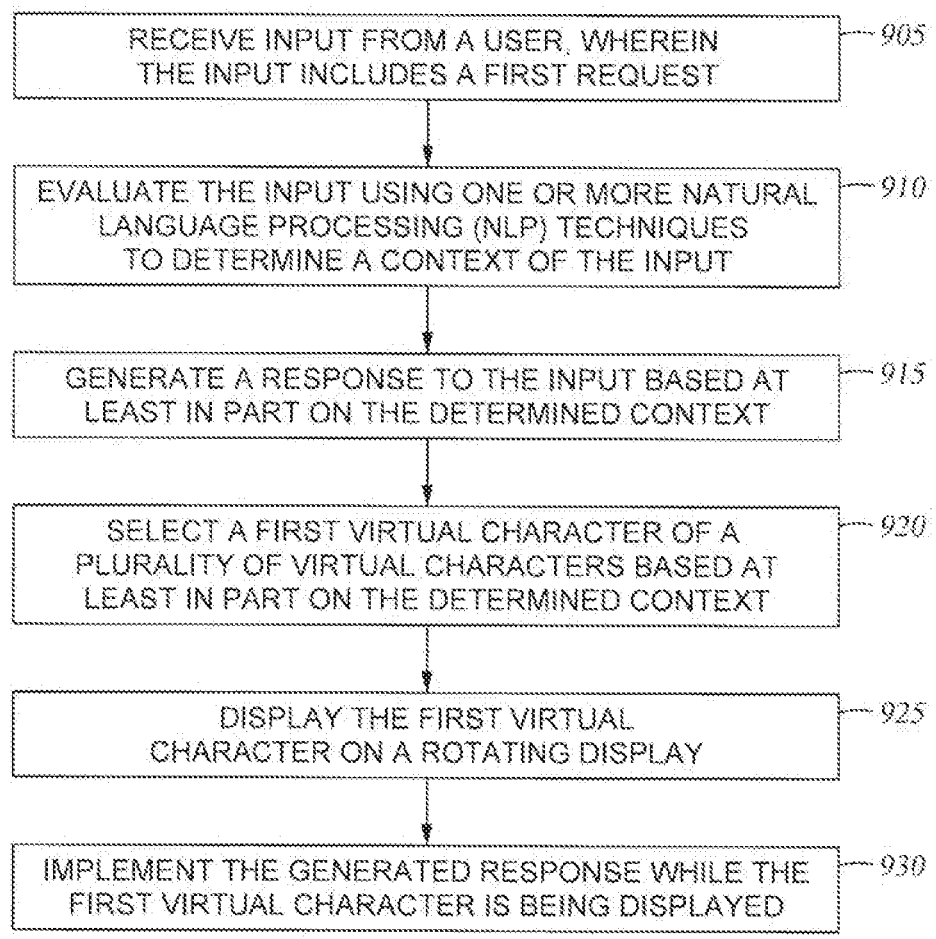
FIG. 9 is a flow diagram illustrating a method of providing an immersive experience to users, according to one embodiment described herein.

FIG. 9 is a flow diagram illustrating a method of providing an immersive experience to users, according to one embodiment described herein. The method 900 begins at block 905, where a Display Device 105 receives input from a user, wherein the input includes a first request. At block 910, the Display Device 105 evaluates the input using one or more natural language processing (NLP) techniques to determine a context of the input. The method 900 then proceeds to block 915, where the Display Device 105 generates a response to the input based at least in part on the determined context. Additionally, at block 920, the Display Device 105 selects a first virtual character of a plurality of virtual characters based at least in part on the determined context. The method 900 continues to block 925, where the Display Device 105 displays the first virtual character on a rotating display. Finally, at block 930, the Display Device 105 implements the generated response while the first virtual character is being displayed.

In the current disclosure, reference is made to various embodiments. However, it should be understood that the present disclosure is not limited to specific described embodiments. Instead, any combination of the preceding features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   establishing a connection between a first device and a second device;
   receiving, by the first device, a first input from a user, wherein the first input includes a first request to output multimedia belonging to a first franchise;
   evaluating the first input using one or more natural language processing (NLP) techniques to determine a context of the first input;
   generating, by the first device, a response to the first input based at least in part on the determined context;
   selecting a first virtual character of a plurality of virtual characters based at least in part on the determined context, comprising:
      identifying one or more characters in one or more multimedia assets belonging to the first franchise; and
      determining that the first virtual character is a character in the requested multimedia;
   displaying the first virtual character on a rotating display of the first device;
   triggering the second device to output the requested multimedia;
   implementing the generated response while the first virtual character is being displayed;
   receiving metadata for the requested multimedia, wherein the metadata specifies a set of timestamps for a set of events in the requested multimedia;
   determining, based on a first timestamp of the set of timestamps, that a first event from the set of events will occur next in the requested multimedia;
   upon reaching the first timestamp in the requested multimedia, outputting, by the the first device, an indication of an available second response based on the first event;
   receiving, by the first device, a second input from the user, wherein the second input includes a second request in response to the indication of the available second response; and
   upon receiving the second request from the user, implementing, on the first device, the available second response, wherein the available second response comprises verbal commentary performed by the first virtual character about the first event at the first timestamp in the requested multimedia.

2. The method of claim 1, wherein implementing the generated response comprises instructing one or more lighting devices to modify a color or illumination status of one or more lights.

3. The method of claim 1, the method further comprising:
   evaluating a second input from the user to determine a second context;
   upon determining that the first virtual character does not have a predefined association with the second context:
      outputting a third response using the first virtual character, wherein the third response indicates that the first virtual character cannot respond to the second context; and
      selecting a second virtual character, of the plurality of virtual characters, based on the second context.

4. The method of claim 1, the method further comprising:
   modifying at least one aspect of the first virtual character based on the generated response, wherein modifying the at least one aspect comprises changing clothing worn by the first virtual character.

5. The method of claim 1, the method further comprising:
   evaluating a second input from the user to determine a second context;

upon determining that no virtual character has a predefined association with the second context, outputting a third response using a default virtual character.

6. The method of claim 1, the method further comprising, during output of the multimedia:
identifying the set of events in the multimedia based on the metadata included with the multimedia; and
generating a third response based on a predefined association between a second event and the third response, wherein the third response includes a character reaction of the first virtual character in response to the second event.

7. The method of claim 1, the method further comprising:
receiving input from second user; and
determining a location of the second user; and
outputting a third response, wherein outputting the third response comprises rendering the first virtual character on the rotating display such that the first virtual character is facing towards the determined location of the second user.

8. A system comprising:
one or more computer processors; and
a memory containing a program which when executed by the one or more computer processors performs an operation, the operation comprising:
establishing a connection between a first device and a second device;
receiving, by the first device, a first input from a user, wherein the first input includes a first request to output multimedia belonging to a first franchise;
evaluating the first input using one or more natural language processing (NLP) techniques to determine a context of the first input;
generating, by the first device, a response to the first input based at least in part on the determined context;
selecting a first virtual character of a plurality of virtual characters based at least in part on the determined context, comprising:
identifying one or more characters in one or more multimedia assets belonging to the first franchise; and
determining that the first virtual character is a character in the requested multimedia;
displaying the first virtual character on a rotating display of the first device;
triggering the second device to output the requested multimedia;
implementing the generated response while the first virtual character is being displayed;
receiving metadata for the requested multimedia, wherein the metadata specifies a set of timestamps for a set of events in the requested multimedia;
determining, based on a first timestamp of the set of timestamps, that a first event from the set of events will occur next in the requested multimedia;
upon reaching the first timestamp in the requested multimedia, outputting, by the first device, an indication of an available second response based on the first event;
receiving, by the first device, a second input from the user, wherein the second input includes a second request in response to the indication of the available second response; and
upon receiving the second request from the user, implementing, on the first device, the available second response, wherein the available second response comprises verbal commentary performed by the first virtual character about the first event at the first timestamp in the requested multimedia.

9. The system of claim 8, wherein implementing the generated response comprises instructing one or more lighting devices to modify a color or illumination status of one or more lights.

10. The system of claim 8, the operation further comprising:
evaluating a second input from the user to determine a second context;
upon determining that the first virtual character does not have a predefined association with the second context:
outputting a third response using the first virtual character, wherein the third response indicates that the first virtual character cannot respond to the second context; and
selecting a second virtual character, of the plurality of virtual characters, based on the second context.

11. The system of claim 8, the operation further comprising:
modifying at least one aspect of the first virtual character based on the generated response, wherein modifying the at least one aspect comprises changing clothing worn by the first virtual character.

12. The system of claim 8, the operation further comprising:
evaluating a second input from the user to determine a second context;
upon determining that no virtual character has a predefined association with the second context, outputting a third response using a default virtual character.

13. The system of claim 8, the operation further comprising, during output of the multimedia:
identifying the set of events in the multimedia based on the metadata included with the multimedia; and
generating a third response based on a predefined association between a second event and the third response, wherein the third response includes a character reaction of the first virtual character in response to the second event.

14. The system of claim 8, the operation further comprising:
receiving input from second user; and
determining a location of the second user; and
outputting a third response, wherein outputting the third response comprises rendering the first virtual character on the rotating display such that the first virtual character is facing towards the determined location of the second user.

15. A computer product comprising logic encoded in a non-transitory medium, the logic executable by operation of one or more computer processors to perform an operation comprising:
establishing a connection between a first device and a second device;
receiving, by the first device, a first input from a user, wherein the first input includes a first request to output multimedia belonging to a first franchise;
evaluating the first input using one or more natural language processing (NLP) techniques to determine a context of the first input;
generating, by the first device, a response to the first input based at least in part on the determined context;
identifying one or more characters in one or more multimedia assets belonging to the first franchise; and determining that the first virtual character is a character in the requested multimedia;

selecting a first virtual character of a plurality of virtual characters based at least in part on the determined context and based on determining that the first virtual character corresponds to a character from the multimedia;

displaying the first virtual character on a rotating display of the first device;

triggering the second device to output the requested multimedia;

implementing the generated response while the first virtual character is being displayed;

receiving metadata for the requested multimedia, wherein the metadata specifies a set of timestamps for a set of events in the requested multimedia;

determining, based on a first timestamp of the set of timestamps, that a first event from the set of events will occur next in the requested multimedia;

upon reaching the first timestamp in the requested multimedia, outputting, by the first device, an indication of an available second response based on the first event;

receiving, by the first device, a second input from the user, wherein the second input includes a second request in response to the indication of the available second response; and upon receiving the second request from the user, implementing, on the first device, the available second response, wherein the available second response comprises verbal commentary performed by the first virtual character about the first event at the first timestamp in the requested multimedia.

16. The computer product of claim 15, wherein implementing the generated response comprises instructing one or more lighting devices to modify a color or illumination status of one or more lights.

17. The computer product of claim 15, the operation further comprising:

evaluating a second input from the user to determine a second context;

upon determining that the first virtual character does not have a predefined association with the second context:

outputting a third response using the first virtual character, wherein the third response indicates that the first virtual character cannot respond to the second context; and selecting a second virtual character, of the plurality of virtual characters, based on the second context.

18. The computer product of claim 15, the operation further comprising:

modifying at least one aspect of the first virtual character based on the generated response, wherein modifying the at least one aspect comprises changing clothing worn by the first virtual character.

19. The computer product of claim 15, the operation further comprising:

evaluating a second input from the user to determine a second context;

upon determining that no virtual character has a predefined association with the second context, outputting a third response using a default virtual character.

20. The computer product of claim 15, the operation further comprising, during output of the multimedia:

identifying the set of events in the multimedia based on the metadata included with the multimedia; and generating a third response based on a predefined association between a second event and the third response, wherein the third response includes a character reaction of the first virtual character in response to the second event.

* * * * *

UNITED STATES PATENT AND TRADEMARK OFFICE
CERTIFICATE OF CORRECTION

| | | |
|---|---|---|
| PATENT NO. | : 11,256,460 B2 | Page 1 of 1 |
| APPLICATION NO. | : 16/268248 | |
| DATED | : February 22, 2022 | |
| INVENTOR(S) | : Michael P. Goslin et al. | |

It is certified that error appears in the above-identified patent and that said Letters Patent is hereby corrected as shown below:

In the Drawings

On sheet 3 of 9, in Figure 3, reference numeral 340, Line 2, delete "MADIA" and insert -- MEDIA --.

In the Specification

In Column 9, Line 32, after "participant" insert -- . --.

In the Claims

In Column 16, Line 31, in Claim 1, delete "the the" and insert -- the --.

Signed and Sealed this
Seventeenth Day of May, 2022

*Katherine Kelly Vidal*
Katherine Kelly Vidal
*Director of the United States Patent and Trademark Office*